July 19, 1966 K. G. TROBECK 3,261,595
METHOD OF TREATING GASES FOR LIBERATING SOLID
PARTICLES AND MOISTURE THEREFROM
Filed Feb. 2, 1961 2 Sheets-Sheet 1
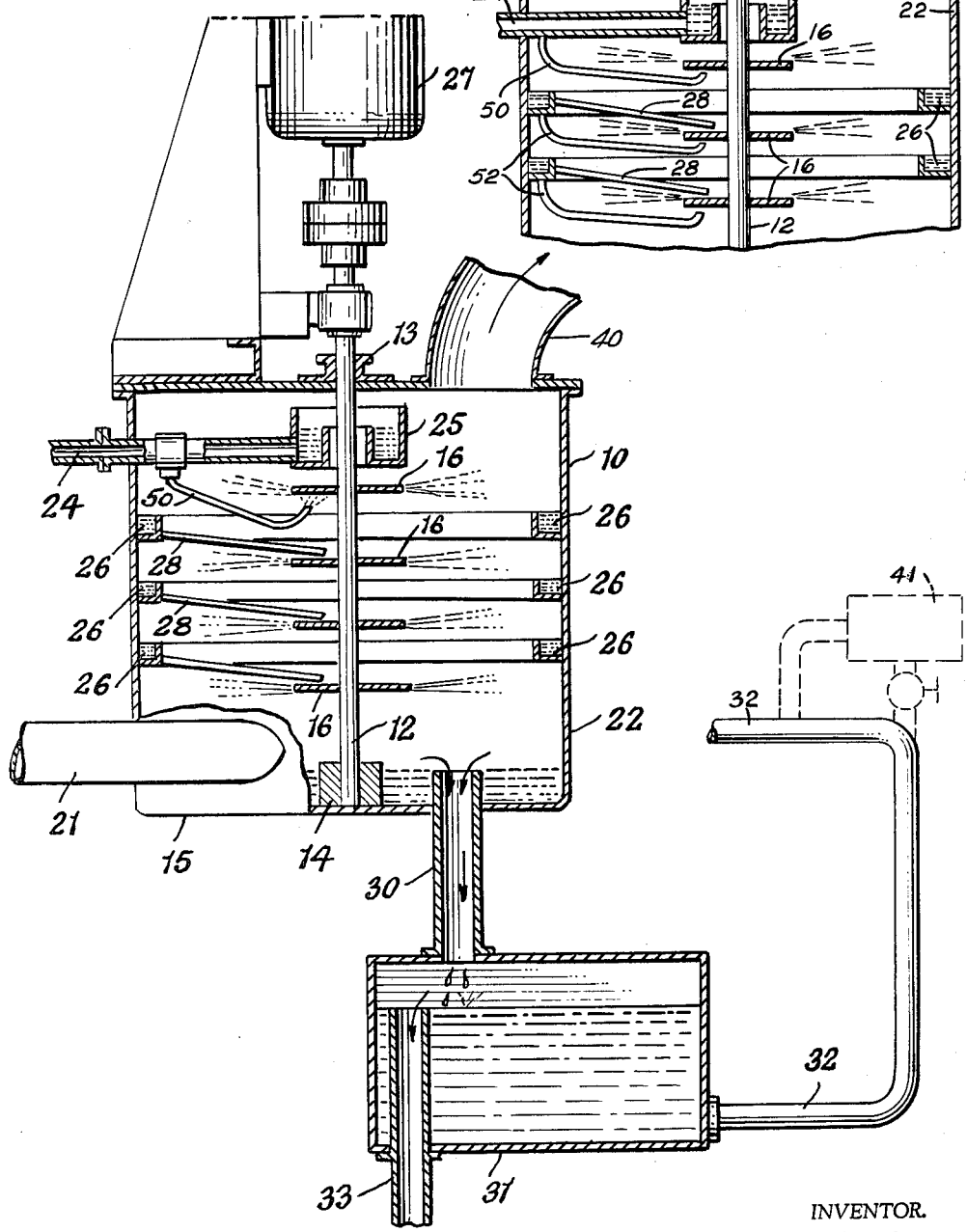
INVENTOR.
Karl Gustaf Trobeck
deceased BY Ake Furrer, Admin.

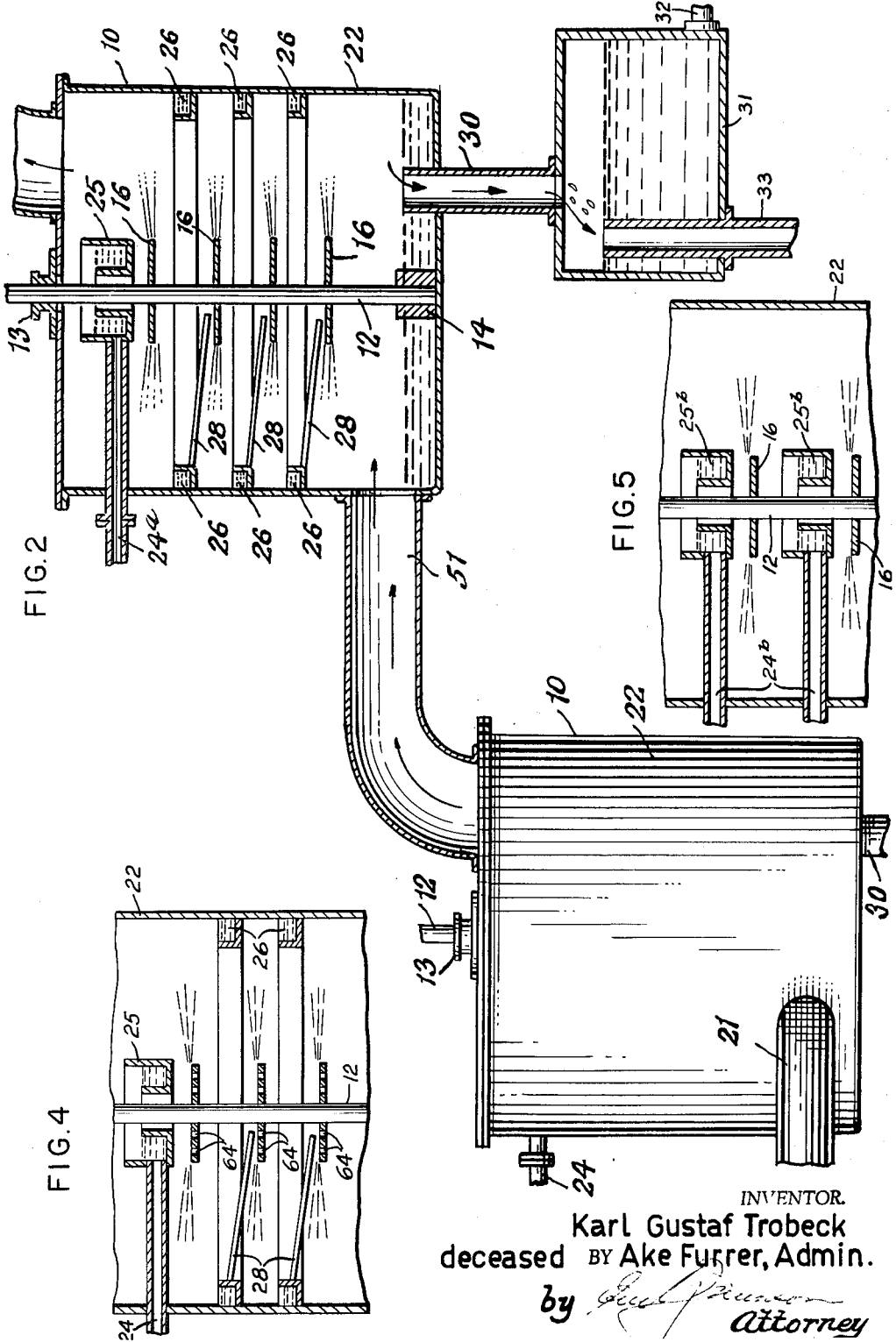

United States Patent Office 3,261,595
Patented July 19, 1966

3,261,595
METHOD OF TREATING GASES FOR LIBERATING SOLID PARTICLES AND MOISTURE THEREFROM
Karl Gustaf Trobeck, deceased, late of Danderyd, Sweden, by Åke Furrer, administrator, Tomtebogatan 5, Stockholm, Sweden
Filed Feb. 2, 1961, Ser. No. 86,830
16 Claims. (Cl. 261—3)

This invention relates to a method for liberating solid particles and moisture from the gases which escape in the operation of industrial boilers, ovens and other industrial installations.

The principal object of the invention is to provide a method for treating such gases in order to liberate solid particles and moisture carried thereby, thus reducing the air pollution from such installations, and making possible, in certain adaptations of the invention, the recovery of the substances liberated from the gases.

Other objects and advantages of the invention will be made to appear in the following more detailed description of several practical embodiments of the invention.

Devices such as electro filters heretofore used for treating such gases in order to separate the solid particles, have either been too expensive in cost, or have proved ineffective, particularly as soot filters, being capable of filtering out only about 70 to 80% of the solid particles in the gases.

Stated generally, the object and advantages of the invention are achieved by subjecting the gases to liquid absorption of the solid particles as well as droplets suspended in the gases.

More particularly, this is accomplished in accordance with the invention by conducting the gases through an absorption chamber in which the solid particles are taken up by thin horizontal liquid curtains, through which the gases have to pass. These liquid curtains are formed within the chamber by means of a series of horizontal rotating surfaces, such as circular discs or plates, mounted in series on a rotatable shaft extending vertically at the axis of the absorption chamber, the arrangement being such that the washing liquid meets the gases in countercurrent direction.

Scrubber installations of the general type referred to above have heretofore been proposed for the absorption of gaseous particles as well as droplets and solid particles suspended in the gases. The heretofore proposed installations, however, have not come into practical use, apparently because they have been inefficient in operation, or for reasons related to or stemming from mechanical faults.

As a result of numerous experiments in dealing with this problem, it has been found that solid particles as well as droplets suspended in a gas can be removed therefrom with extraordinary efficiency by imparting to the rotating surfaces, such as the surfaces of rotating discs, a peripheral speed amounting, in the case, for example, of a disc having a diameter of 80 centimeters, to not less than 10 meters per second. Thus, in the case of a disc of the diameter mentioned, the rotary speed will be at least 240 revolutions per minute.

Further, it is an important feature of the invention, enabling more effective operation to be attained, that provision is made for leading liquid to the under sides of the rotating surfaces, thereby preventing solid particles from collecting on the under side of these surfaces, and thus produce an imbalance.

In accordance with the invention, moreover, the quantity of liquid supplied to the rotating surfaces should not substantially exceed a certain maximum rate, depending upon the surface area and peripheral speed of the rotating surfaces. Thus, when the scrubbing liquid used is pure or substantially pure water, and where the disc or other rotating surface has a diameter of 80 centimeters and is rotated at a peripheral speed of 10 meters per second, not more than about 100 liters water per minute should be supplied. On the other hand, when the scrubbing liquid is black liquor derived in the sulfate process of preparing paper pulp, and having a specific weight of, for example, about 1.5, with discs of the same surface area and peripheral speed as above mentioned, not more than about 50 liters per minute of the black liquor should be supplied to the discs.

In its most desirable embodiments, in order to obtain substantially complete and satisfactory absorption of the solids and droplets by the scrubbing liquid, a series of at least three vertically spaced rotating surfaces is utilized in the scrubbing chamber. The liquid is preferably supplied to the uppermost one of the series, being delivered thereto substantially at its axis so that it is flung centrifugally by the rotating surface outwardly toward the vertical wall of the chamber where it may be collected in receivers, such as gutters, suitably arranged along the wall, and from which it may be delivered, as by a radially extending duct or other passageway substantially at the axis of the next lower rotating surface in the series, so as to be flung outwardly by the latter and be collected in an associated receiver in the manner above briefly described, for delivery to the next lower rotating surface of the series, and so on down through the entire series. If desired, however, the respective receivers associated with any one or more of the rotating surfaces may be dispensed with, in which event the scrubbing liquid would be supplied independently to each of the rotating surfaces.

Desirably, in supplying the liquid to the discs the rate of supply should be such that the amount flung outwardly by the centrifugal action of the uppermost disc in the series will be substantially equal to the sum of the amounts flung out by the lower discs in the series, per unit of time.

Moreover, in supplying the liquid to the discs, the temperature of the liquid supplied to the uppermost disc of the series should range between about 30° to 60° C.

It is an advantage of the invention that when the solid particles liberated from the gases in accordance herewith are water-soluble and of recoverable value, the aqueous solution thereof may be re-cycled for use as the absorbing medium in the process, until the desired concentration of the solid in solution is obtained, whereupon a fresh supply of the water in an amount corresponding substantially to the quantity removed from the system, may be supplied thereto. On the other hand, if the particles liberated from the gases are insoluble in water or other scrubbing liquid used, the solid particles may be separately removed from the circulating liquid, as by filtration or by a hydroclone. Thus, for example, where the invention is utilized for the treatment of gases emitted from a lime or cement kiln, and containing solid particles which are insoluble in water used as the scrubbing liquid, the particles removed from the gases and which are not soluble in the scrubbing liquid such as water, may be delivered to a battery of hydroclones for removing the solid particles therefrom before the liquid is returned to the system.

In the case of the treatment of gases containing solid particles which are not soluble in the scrubbing liquid, it is important that the bottom side of the rotating surfaces be kept clean. This may be accomplished by leading a narrow tube to the bottom side of the rotating surfaces and supplying the scrubbing liquid through this tube. Preferably, the major portion of the scrubbing liquid is supplied to the top side of each of the rotating surfaces and the remaining portion thereof supplied to the bottom side of the surfaces. In the alternative, supply of the liquid to the bottom side of the surfaces may be by the provision of a number of fine perforations through the rotating surface so that liquid from the top side thereof may flow to the bottom side thereof.

In accordance with the invention, furthermore, the speed of the gases, calculated on the free area between the wall of the scrubbing chamber and the periphery of the rotating surfaces, should not exceed an average of about two meters per second, preferably about one meter per second. The speed of the gases is here stated as an average speed, inasmuch as a uniform speed might not be maintained by the gas molecules at different parts of the scrubber, since the gas formed of the liquid droplets flung from the rotary surfaces in the form of veils of vapor flows immediately beneath these veils towards the wall of the scrubber, where it ascends through the portions of the veils which are not as dense as those closer to the periphery of the rotating surfaces. Accordingly, the scrubber should not have too large a diameter in relation to the diameter of the rotating surfaces, since the vapor veils most remote from the rotating surfaces may then be too thin to serve their intended function. In terms of a specific embodiment, where the rotating surfaces are of a diameter of 80 centimeters, the diameter of the scrubber may suitably be 5 meters.

The gas discharged from the scrubber after passing the vapor veil formed at the uppermost one of the series of rotating surfaces may, desirably in many instances, be passed through a cyclone or similar device, for removal of droplets of scrubbing liquid carried along by the gas.

The invention has been found of particular utility in the treatment of flue gases emitted from soda house boilers. These gases, after being first passed through an economizer, may then be delivered to a first scrubber for treatment in accordance with the invention to remove the solid particles and the $SO_2$ in the gases. If the gases are not completely freed of solid particles and $SO_2$ after having passed this first scrubber, they are conducted to a second scrubber of the same construction, for treatment with scrubbing liquid consisting of circulating warm water. If the temperature of the flue gases before entering the first scrubber is high enough, the gases can be further cooled by passing them through an air pre-heater of suitable arrangement. This first scrubber, in which black liquor, having a specific weight of 1.5 to 1.6 is utilized as the scrubbing liquid, and in which there are at least four of the rotating surfaces, to each of which the black liquor is supplied, should operate at a temperature above the dew point of the gases, suitably 5 degrees C. above the dew point. The scrubbing liquid is supplied at a rate of preferably 25 and not more than 50 liters per minute, to each of the rotating surfaces. In the second scrubber, in which, as above stated, the scrubbing liquid consists of circulating warm water, the temperature is also maintained above the dew point, suitably one degree C. above the same. In this manner, the gas will be completely freed of chemicals and impurities. The water discharged from this scrubber may have a pH value higher than 5.0, which value may be attained by the addition of sodium carbonate to the circulating water. The heat held by the gases withdrawn from the second scrubbing chamber may be recovered in a scrubber of any known construction. The gas may be introduced into the bottom and cold water supplied to the top of this last scrubber. The warm water removed at the bottom of this last scrubber may thereafter be used for manufacturing purposes, such as the washing of paper pulp.

The invention also finds utility for the condensation of water vapor contained in gases discharged from various industrial installations, particularly those in which the discharged gases contain relatively large amounts of water vapor. In such cases, after the heat content of the flue gases has been to a large extent utilized in a steam boiler as well as in an economizer connected thereto, the gases may be cooled down by bringing them into intimate contact with cooling water of such a temperature and in such a quantity that the larger portion of the water vapor present in the flue gases will be condensed and become mixed with the cooling water. To that end, the gases are conducted into the bottom of the apparatus constructed according to the invention, where they ascend through at least four curtains of cooling water, by feeding the cooling water on to a series of rapidly rotating surfaces, such as the discs herein described. The cooling water may be supplied to each of the discs through a conduit leading directly from a water supply system or from a collector common to all of them. The discs are rotated at such a speed that the cooling water is centrifugally spread out in the chamber, so that the cooling water reaching the wall of the chamber and augmented with condensed vapor, is collected and conducted to the next lower disc of the series, where it is again spread out by centrifugal force into the ascending gases.

In the accompanying drawing:

FIG. 1 illustrates a preferred form of apparatus that may be utilized in the practice of the invention;

FIG. 2 shows two of the scrubbers in coupled relation;

FIGS. 3, 4 and 5 are fragmentary views illustrating modified embodiments of the scrubbing chamber illustrated in FIG. 1.

The treating chamber is indicated generally by numeral 10, and comprises an upright cylindrical container having a vertically extending shaft 12 mounted axially thereof in a suitable bearing 13 at the top of the container, and in a suitable, liquid-sealed bearing 14 at the bottom 15 of the container. The diameter of the container may suitably be from four to ten meters, preferably 5 meters, and of a height of three to ten, preferably four meters.

Suitably affixed along the length of the shaft 12, for rotation therewith, are a series of vertically spaced circular plates or discs 16, whose diameter may be from 0.5 to 1.5 meters, preferably about 80 centimeters. The discs are spaced about 0.75 meter from one another.

Shaft 12 is driven by a motor 27 at a rotational speed such that the peripheral speed of the discs 16 is not less than 10 meters per second in the case of discs having an outside diameter of 80 centimeters.

The gases to be treated are introduced into the container through a gas inlet 21 extending through the wall 22 thereof adjacent the bottom 15 of the container. A liquid inlet pipe 24 extends through the wall 22 of the container adjacent the top wall thereof, the inner end of the inlet pipe 24 being connected to an annular feed chamber 25 extending around the shaft 12, for delivery of the scrubbing liquid onto the top face of the uppermost one of the series of rotating discs or plates 16.

Fixed around the interior of the wall 22 of the container, below each of the plates 16 of the series, except the lowermost one, is a receiving or collecting channel or trough 26 for receiving the liquid droplets flung centrifugally outward by the rotating disc immediately thereabove and which impinge and collect, along with condensed vapor, on the wall 22. The liquid thus collected in the troughs 26 may be delivered, as by means of radial ducts 28, to the rotating disc or plate disposed immediately therebeneath in the series, the ducts 28 being arranged so as to discharge the liquid onto the top surface of the discs adjacent the center thereof. As will be understood, the collected liquid from the troughs 26, and thus delivered to the rotating discs therebelow will be flung or spread outwardly by centrifugal force, into the path of the ascending gases and will be collected in the troughs 26 immediately therebelow.

The liquid flung from the surface of the lowermost disc 16 of the series, after it has reached the wall of the container, flows therealong to the bottom of the container, where it may be maintained at a desired overflow level by means of a pipe 30 extending up through the bottom wall 15 of the container. Pipe 30 is connected at its lower end with a receiving chamber 31 beneath the container 10. Liquid collected in chamber 31 may be continuously removed by means of conduit 32. If desired, the liquid withdrawn through conduit 32 may be pumped through a cooling tower discharging the cooled liquid to the uppermost of the rotating discs 16 for reuse in cooling the gases. Conduit 32 may have interposed therealong any suitable filtering device, or a hydroclone (or battery thereof), as represented diagrammatically by reference numeral 41 in FIG. 1. Other portions of the liquid in chamber 31 are continuously removed through overflow pipe 33 arranged to maintain a constant liquid level in the chamber 31.

The treated gas is discharged at the upper end of chamber 10 through an outlet 40.

In FIG. 2, two of the scrubbers are shown connected together by tube 51 (which may correspond to the outlet 40 of FIG. 1) for treatment of gases successively with two different scrubbing liquids. Thus, the gases may be treated in the first scrubber (at the left of FIG. 2) with water or other suitable scrubbing liquid, and the gases discharged from the first scrubber may then be treated in the second scrubber (at the right of FIG. 2) with scrubbing liquid consisting of warm water directed into the second scrubber through pipe 24a. The two scrubbers are of substantially similar construction.

As stated above, when the gases to be treated contain solid particles which are insoluble in the scrubbing liquid, it is important that provision be made for keeping the bottom sides of the rotating surfaces 16 clean. As indicated, the preferred method of doing so is to supply a major portion of the scrubbing liquid to the top side of the surfaces and the remaining portion thereof to the bottom side of the surfaces. FIG. 3 shows this preferred method. As there illustrated, a portion of the scrubbing liquid supplied through tube 24 may be delivered through a narrow tube 50 leading to the bottom side of the uppermost of the rotating surfaces 16, while liquid collected in the troughs 26 is delivered through narrow tubes 52 to the bottom side of the respective lower rotating surfaces 16.

An alternative mode of supplying scrubbing liquid to the bottom side of the rotating surfaces 16 is illustrated in FIG. 4, and as above stated, comprises a number of fine perforations 64 extending through the rotating surfaces 16, so as to enable scrubbing liquid from the top side of the surfaces to flow to the bottom side thereof, and thereby keep the latter clean of particles removed from the gases and which are insoluble in the scrubbing liquid.

As above also set forth, the receivers or troughs 26 associated with one or more of the rotating surfaces may be dispensed with, in which event the scrubbing liquid is supplied independently to each of such rotating surfaces. To that end, the scrubbing chamber may embody the construction shown in FIG. 5. As there illustrated, in lieu of the troughs 26 of FIGS. 1–4 the scrubbing liquid supplied to the top of each of the rotating surfaces 16 is delivered through a liquid inlet pipe 24b extending through wall 22 of the chamber and having its inner end connected to an annular feed chamber 25b extending around shaft 12.

What is claimed is:

1. The method of treating industrial gases for removing solid particles and liquid droplets therefrom, which comprises subjecting the gases to a scrubbing action consisting essentially of:
    (a) causing gases which emanate from a soda house bailer to ascend vertically in a chamber having a vertical wall;
    (b) forming a series of vertically spaced curtains of scrubbing liquid, each of said curtains being disposed generally horizontally in said chamber and in the path of ascending flow of the gases in said chamber;
    (c) delivering scrubbing liquid onto each of a plurality of vertically spaced horizontal surfaces while simultaneously rotating all of said surfaces to cause them to fling the scrubbing liquid therefrom in the form of fine droplets by centrifugal force, thereby to form said series of curtains and to cause said droplets of scrubbing liquid to impinge upon said vertical wall of said chamber, the peripheral speed of said surfaces corresponding to not less than 10 meters per second for a surface having a diameter of 80 centimeters, said scrubbing liquid being waste sulfate liquor.
    (d) controlling the quantity of said scrubbing liquid delivered to said rotating surfaces so as not to exceed a rate of approximately 100 liters per minute for rotating surfaces of the aforesaid diameter and peripheral speed;
    (e) controlling the rate of ascension of the gases in said chamber so as not to exceed an average speed of about two meters per second, calculated on the free area between the periphery of said rotating surfaces and said wall of the chamber;
    (f) discharging the scrubbed gas at the top of said chamber after it has passed the uppermost of said surfaces; and
    (g) removing at the bottom of said chamber, scrubbing liquid collected from said wall thereof.

2. The method of claim 1, wherein the scrubbing liquid is initially delivered onto the uppermost one of said rotating surfaces, and wherein said liquid flung therefrom and impinging on the wall of said chamber is collected directly from said wall immediately beneath said uppermost rotating surface and is conducted to the next lower rotating surface of said series to again be flung outward by the latter against the wall of said chamber.

3. The method of claim 1, wherein a portion of the said scrubbing liquid is supplied to the bottom side of each of said rotating surfaces, said portion being sufficient to prevent solid particles which are insoluble in said scrubbing liquid from accumulating on said bottom surfaces.

4. The method of claim 1, wherein the major portion of the said scrubbing liquid is supplied to the top side of each of said rotating surfaces, and the remaining portion of said liquid is supplied to the bottom side of said rotating surfaces, said remaining portion being sufficient to prevent solid particles which are insoluble in said scrubbing liquid from accumulating on said bottom surfaces.

5. The method of claim 1, wherein said gases emanate from a soda house boiler, and wherein said scrubbing liquid is waste sulfate liquor having a specific weight of the order of 1.5 to 1.6.

6. The method of claim 5, wherein there are at least four of said rotating surfaces in said chamber, and wherein said rate of supply of said liquor will maintain the temperature of the gases in said chamber at about 5° C. above the dew point of said gases.

7. The method of claim 1, wherein the scrubbing liquid is supplied to the uppermost of said rotating surfaces at a temperature in the range of 30° to 60° C.

8. The method of claim 1, wherein said gases are the combustion gases produced by the combustion of sulfate liquor, and wherein said scrubbing liquid consists of cooling water.

9. The method of claim 8, wherein the scrubbing water impinging as droplets upon the wall of the chamber is collected directly from said wall and is removed from said chamber, and wherein the water thus removed from said chamber has a pH value higher than 5.0.

10. The method of claim 1, wherein the gases discharged from said chamber are led to a second chamber of the same construction as the first one and in which the gases are scrubbed in the same way as in the first chamber but with pure warm water of such temperature that the temperature of the gases is maintained at least 1° C. above the dew point.

11. The method of claim 10, wherein the gases in the first chamber are scrubbed with waste sulfate liquor of a specific weight of the order of 1.5 to 1.6 and wherein the gases in the second chamber are scrubbed with pure water of such high temperature, that the temperature of the gases is maintained at least 1° C. above the dew point.

12. The method of claim 10, wherein the gases in the first chamber are scrubbed with waste sulfate liquor and wherein the gases discharged from said first chamber are delivered to said second chamber and scrubbed therein with said warm water.

13. The method as defined in claim 1, wherein the scrubbing liquid is delivered independently to each of said rotating surfaces.

14. The method as defined in claim 1, wherein a portion of the liquid removed from the bottom of said chamber is recycled for delivery onto the uppermost of said rotating horizontal surfaces.

15. The method as defined in claim 14, wherein solid particles removed from the ascending gases in said chamber are soluble in said scrubbing liquid and, wherein said solution thereof constitutes said recycled portion of said scrubbing liquid.

16. The method as defined in claim 14, wherein solid particles removed from the ascending gases in said chamber are insoluble in said scrubbing liquid, and wherein said particles are removed from said recycled portion of the liquid removed from said chamber before said portion is delivered onto said rotating horizontal surface.

References Cited by the Examiner

UNITED STATES PATENTS

| 916,147 | 3/1909 | Gosline. | |
| 1,692,617 | 11/1928 | Bowen | 261—90 |
| 1,786,150 | 12/1930 | Cutler | 261—89 |
| 1,992,762 | 2/1935 | Pease. | |
| 2,046,895 | 7/1936 | Delamere | 261—89 |
| 2,235,998 | 3/1941 | Kleinschmidt | 261—89 X |
| 2,487,176 | 11/1949 | Pitt et al. | 261—29 X |
| 2,858,119 | 10/1958 | Wright et al. | 261—112 X |

FOREIGN PATENTS 812,706    4/1959    Great Britain.

HARRY B. THORNTON, *Primary Examiner.*

RONALD R. WEAVER, HERBERT L. MARTIN, D. M. RIESS, S. S. HUSTING, *Examiners.*